Figure 1:
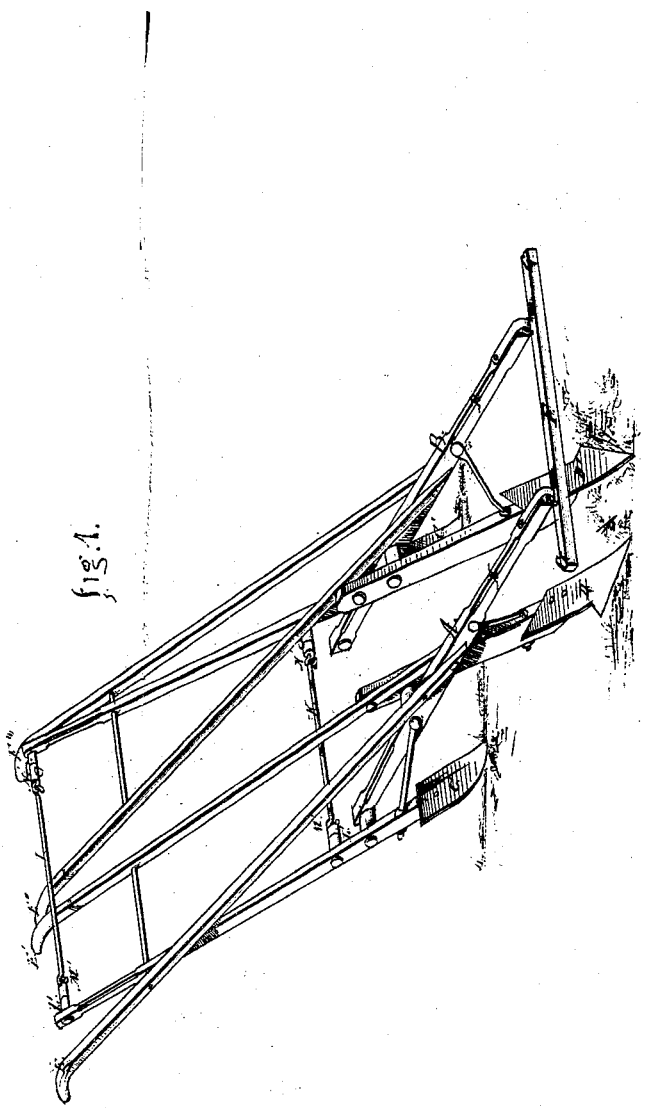

F. G. Mourning,
Corn Plow.
No. 107,400. Patented Sep. 13, 1870.

Witnesses:
Adolph Rinker
Samuel Jacob Wallace

Inventor:
Felix Mundy Mourning

UNITED STATES PATENT OFFICE.

FELIX G. MOURNING, OF BASCOW, ILLINOIS.

IMPROVEMENT IN CORN-PLOWS.

Specification forming part of Letters Patent No. 107,400, dated September 13, 1870.

*To all whom it may concern:*

Be it known that I, FELIX G. MOURNING, of Bascow, Hancock County, Illinois, have made a new and useful invention of an Improvement in Corn-Plows, which I declare to be made and used substantially as shown and set forth herein and in the accompanying drawing, in which letters of reference to the several parts correspond with those herein used.

Figure 1 is a perspective view of my corn-plow.

This invention is intended to improve and complete the style of double corn-plows, in which a set of the plows operates on each side of a row of plants to cultivate them, being drawn by two horses and operated by one man, finishing the row at one passage.

This invention consists more especially of details.

A and B represent two such double corn-plows connected together for use.

C C' and D D' are the two sets of plows. These are either all "shovels" or all "diamonds," or part of each, as desired, being made removable for that purpose.

The plowman walks on one side of the row of plants, and guides both plows by the handles of one or of both, E E' E'' E'''.

The horses are attached at the ends of the double-tree F, at G G', on each side of the row of plants.

The double-tree F is attached directly to the ends of the plow-beams H H', by means of clevises and rings, or otherwise, so as to guide and regulate the width of the plows.

The standards of the back plows, C C', are extended upward to a considerable height, and are connected at the top by a cross part, I. The lower parts of the same standards are connected by a cross part, K. The office of these is, with the front connecting part, F, to keep the plows at a definite distance apart, and to cause them to both move alike in all parts.

There are free hinged joints between each of the connecting parts and each set of plows, to enable the plows to freely move.

On each of the parts I and K, between the said joints and the standards, the connecting bolts or rods pass through blocks, L M N O L' M' N' O', before passing through the standards. These are so arranged as to be taken off and placed outside of the standards, the same rods passing through them. This is for the purpose of shortening or regulating the distance between the sets of plows, by changing one or more of the blocks, as before stated.

I am aware plows somewhat like these have been made. I disclaim all such.

What I claim is—

The double sets of plows, as set forth, for cultivating two sides of a row of plants, when made and arranged substantially as set forth, and having the blocks L M N O and L' M' N' O', as set forth, on the two connecting parts I and K, for the purpose described.

FELIX G. MOURNING.

Witnesses:
   SAMUEL JACOB WALLACE,
   ADOLPH RINKER.